June 23, 1964
J. C. RENFRO
3,138,449
METHOD OF MAKING HUMUS
Filed Feb. 8, 1962
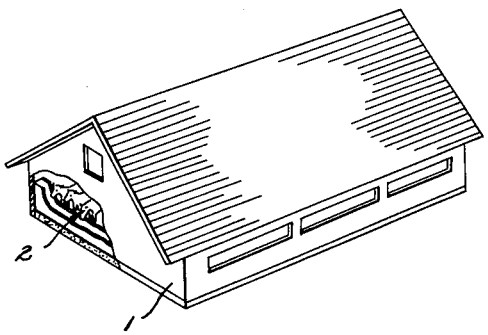
FIG. 1
FIG. 2
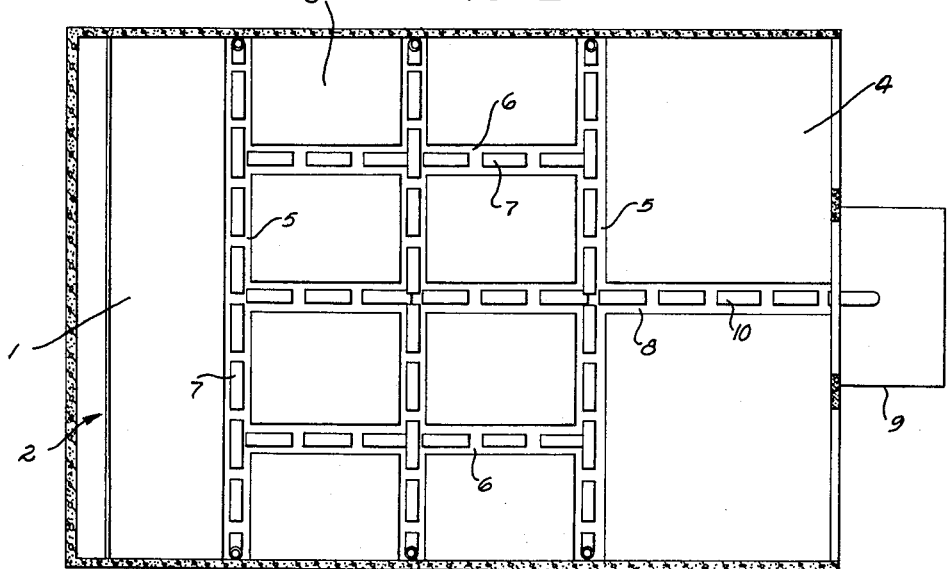
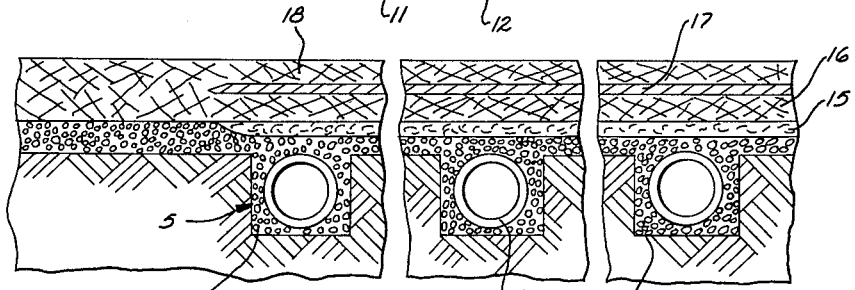
FIG. 3
FIG. 4
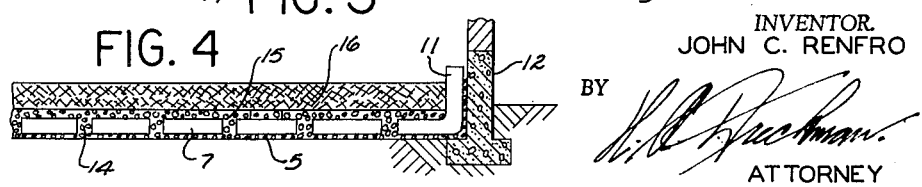
*INVENTOR.*
JOHN C. RENFRO
BY
ATTORNEY 2,138,449
United States Patent Office
Patented June 23, 1964

3,138,449
METHOD OF MAKING HUMUS
John C. Renfro, 18891 Beach Blvd.,
Huntington Beach, Calif.
Filed Feb. 8, 1962, Ser. No. 171,884
4 Claims. (Cl. 71—24)

This invention relates to a method of making humus which is more rapid and effective than when produced by natural causes.

An object of my invention is to provide a method of making humus which is an integral part of the normal life processes of an animal or fowl, where that animal and fowl is inclosed in a barn or lot where it feeds, rests, and exercises, all within the confines of that barn or lot.

Another object of my invention is to provide a humus producing method within the confines of a barn or lot, and where the floor of that barn or lot includes a humus starter, layers of straw, or of cellulose material and manure, all of which is spread substantially evenly over the floor of the barn or lot.

Another object of my invention is to provide a method of the character stated in which the bed or layers of humus producing elements are thoroughly aerated for the purpose of increasing or accelerating the humus producing cycle.

Quoting from a book by Selman A. Waksman entitled "Soil Microbiology," published by John Wiley & Sons, this author explains the part taken by humus in the soil as follows:

"Because of the extensive microbiological population inhabiting it, the soil must be considered not merely a dynamic or even a biological system, but a living system. This assumption can be substantiated as follows: (a) living organisms, belonging both to plant and to animal systems, have taken an active part in the processes of rock weathering and soil formations; (b) these organisms have contributed to the formation and accumulation of one of the most important and characteristic soil constituents, humus, which is largely responsible for differentiating a soil from a mere mass of inorganic debris; (c) the soil processes are continuous both in summer and in winter, and are affected by temperature, aeration, moisture and supply of fresh plant and animal residues; (d) the extensive flora and fauna representing numerous forms of life that inhabit the soil range from the smallest bacteria to the large burrowing animals and the roots of higher plants."

In my method a compost pile is prepared, which includes stable manures or plant residues supplemented with inorganic fertilizer, and conditions are made favorable to the activities of aerobic micro-organisms by proper aeration and the provision of sufficient moisture.

Other objects, advantages and features of invention may appear from the accompanying drawing, the subjoined detailed description and the appended claims.

In the drawing:

FIGURE 1 is a perspective of an inclosure or barn within which my method of making humus can be carried out.

FIGURE 2 is a horizontal sectional view of the barn or inclosure.

FIGURE 3 is an enlarged fragmentary vertical sectional view of the floor of the barn or inclosure.

FIGURE 4 is another fragmentary vertical sectional view of the floor of the barn or inclosure.

Referring more particularly to the drawing, the numeral 1 indicates a barn, inclosure, or lot, in which herbivorous animals are inclosed and in which they feed, rest, and exercise. One of the purposes of the inclosure is to retain the heat which is generated in my humus producing method which will thus increase the comfort of the animals during cold weather, and will also increase their health. The lot or inclosure 1 is approximately 30 or 40 feet in width and about 50 feet in length, more or less. An inclosure of this size will accommodate approximately ten full grown animals, such as a cow or horse. At one end 2 of the inclosure 1 a feeding area is provided, which includes the usual feed stalls or containers, not shown. Immediately adjacent the feeding area 2 I may provide an area 3 in which the animals circulate, and also where a considerable portion of their time is spent. A third area 4 is also provided for the purpose of permitting exercise and rest for the animals, and which consists primarily of a rather large open area where the animals can either move about or lie down to rest. Within the area 3 I provide a plurality of transverse ditches 5 in the floor of the inclosure 1. These ditches extend the complete width of the barn or lot 1 and are intersected at intervals by longitudinally extending ditches 6. The ditches 5 and 6 are provided for drainage purposes and incloses drain tiles 7 therein through which any excess liquids can flow. A central drainage ditch 8 extends substantially the length of the inclosure 1 and terminates in a pit 9 where excess liquids are collected. The drainage ditch 8 is also provided with drain tile 10 to facilitate drainage. The tile 7 in the ditches 5 are open at both ends and are formed as an elbow 11, so that air will flow freely through the transverse tile 7 and assist in aeration of the compost layer or pile, as will be subsequently described. The elbows 11 are positioned adjacent the peripheral walls 12 of the inclosure 1, and these walls also serve to confine and retain the prepared compost layers of pile, as will be subsequently described.

In preparing the compost pile in which the humus is subsequently formed, I first fill the ditches 5, 7 and 8 with loose rock or gravel 14. This loose rock or gravel also covers the floor of the areas 2, 3 and 4; this entire floor area being covered to a depth of about 1 or 2 inches of gravel or loose rock. Within the areas 3 and 4 I then place a thin layer of humus 15 which acts as a starter for the chemical actions or activity of the micro-organisms. The humus layer 15 is relatively thin and is placed directly upon the bed of rock or gravel 14. Over the entire floor area of the barn or lot 1 is then spread a layer of straw 16, which may be 4 or 5 inches thick, more or less, as desired. The straw 16 is any type of dry natural straw which is a carbohydrate. Upon the straw bed 16 I then spread a thin layer of manure 17, which is spread evenly over the straw as the manure is produced by the animals. The manure is spread preferalby twice a day in order that an even layer may be provided over substantially the entire floor area of the barn or inclosure 1. The humus layer 15, the straw 16, and the manure 17 is now wet with water to about one-half saturation. A thin layer of earth and lime is now spread over the manure 17 for the purpose of neutralizing acids which are present in the manure or straw layers. The entire floor surface of the barn or lot is again wet with water for the purpose of more effectively distributing the earth and lime throughout the layers of straw, humus, and manure. A top layer of straw 18 is now spread over the entire floor of the barn or lot to a depth of 4 to 6 inches, more or less, and this top layer of straw remains dry. This straw layer again is a natural dry straw, such as wheat, barley, rice, etc. The top layer of straw 18 acts as bedding for the animals. The procedure of spreading the manure, straw, wetting the same, is followed preferably twice a day, and as the straw and manure forms into humus it is raked to one side and placed in piles where the humus producing process continues until it is placed on the soil for fertilizing purposes.

Due to the fact that in my method the proper micro-organisms are present, also proper temperatures, moisture, and cellulose are present, together with the necessary carbohydrates, humus is rapidly produced which will be effective and useful as a fertilizer.

The drain tile 7, which is placed in the ditches 5, 6 and 8, may perforated or slotted to permit entry of liquid, or the tile may be slightly spaced end to end, again to permit entry of any liquids which are to be drained off. I have found that an area of approximately 1,000 square feet will produce enough humus to fertilize approximately 30 acres, over a period of about one year.

Having described my invention, I claim:

1. The method of rapidly forming humus within an enclosure containing animals and fowl and wherein the enclosure and animals therein enhance the creation of suitable temperature and humidity conditions, consisting of,
   placing gravel on the "floor" within the enclosure,
   then covering the gravel with a layer of humus starter,
   next covering the humus starter layer with a first layer of straw,
   then placing a layer of manure over the straw,
   then wetting the straw and underlying layers with water until a substantial amount of saturation ensues,
   next placing a thin layer of earth and lime over the wetted straw and manure and wetting the same and,
   finally placing a dry layer of straw over the underlying layers and then recovering the formed humus.

2. The method as set forth in claim 1 wherein the gravel is laid in a ditch.

3. The method as set forth in claim 2 wherein drainage tile is embedded in the gravel within the ditch.

4. The method as set forth in claim 1 wherein the final layer of dry straw is spread over the entire floor of the enclosure to a depth of four to six inches.

References Cited in the file of this patent

UNITED STATES PATENTS

| 27,072 | Rolland | Feb. 7, 1860 |
| 838,036 | Luckey | Dec. 11, 1906 |
| 1,045,130 | Doolittle | Nov. 26, 1912 |
| 1,408,064 | Balmer | Feb. 28, 1928 |
| 1,810,239 | Doolittle | June 16, 1931 |
| 2,750,269 | Klein | June 12, 1956 |
| 2,989,379 | Gilberton | June 20, 1961 |

FOREIGN PATENTS

| 301,105 | Great Britain | Nov. 26, 1928 |